FIG. 4

Jan. 27, 1970  R. D. KLUGE  3,491,861
CONTROL CIRCUIT FOR CLUTCH AND MOTOR
Original Filed Aug. 16, 1965  10 Sheets-Sheet 5

FIG. 5

INVENTOR.
ROBERT D. KLUGE
BY
John Shaw Stevenson

AGENT.

United States Patent Office 3,491,861
Patented Jan. 27, 1970

3,491,861
CONTROL CIRCUIT FOR CLUTCH AND MOTOR
Robert D. Kluge, Westminster, Colo., assignor to Honeywell Inc., Minneapolis, Minn., a corporation of Delaware
Original application Aug. 16, 1965, Ser. No. 480,032, now Patent No. 3,349,510, dated Oct. 31, 1967. Divided and this application June 29, 1967, Ser. No. 658,974
Int. Cl. F16d 23/00, 71/00
U.S. Cl. 192—.02                                    1 Claim

ABSTRACT OF THE DISCLOSURE

A switching circuit in which a first manually operated push-button actuated switch when depressed for only an instant of time will effect the energization of a solenoid actuated clutch to clutch in a slide lifting cam for rotation with an electric motor so that a lobe on this cam can be rotated into contact with a second switch which second switch will then continue to retain a source of power on the motor and to allow the slide lifting function of the motor driven cam to be automatically completed after the first push-button switch has been released.

---

This application is a division of my application Ser. No. 480,032, filed Aug. 16, 1965, now U.S. Patent No. 3,349,510.

The present invention relates to a switching circuit for a photographic slide projector.

It is an object of the invention to provide a first manually operated quick release push-button actuated switch for allowing an operator to show each slide in the tray that is associated within a projector in immediate consecutive order as the slides in the tray are advanced in a forward direction.

It is a more specific object of the present invention to provide a first push-button operated switch of the aforementioned type which need only be manually held in a closed position by the operator for an instant of time and then immediately released because it is electrically connected to cause a solenoid actuating clutch to be energized and the previously mentioned single split phase motor to thereby rotate a lobe that is integrally mounted on the circumferential surface of a slide lifting cam unit in a forward slide showing direction into physical contacting engagement with a second switch so that the solenoid energizing and the resulting slide lifting function performed by the motor will be continued when the release of the first switch takes place.

It is another object of the present invention to provide another manually operated quick release push-button actuated switch for allowing an operator to show each slide in the tray that is associated with the aforementioned projector in a reverse manner from that previously referred to.

It is a more specific object of the present invention to provide a second push-button operated switch of the last-mentioned type which need only be manually held in a closed position by the operator for an instant of time and then immediately released because it is electrically connected to cause a solenoid actuating clutch to be energized and the previously mentioned single split phase motor to thereby rotate a lobe that is integrally mounted on the circumferential surface of a slide lifting cam unit in a reverse slide showing direction into physical contacting engagement with another switch so that the solenoid energizing and slide lifting functions performed by the motor will be continued when the release of the first-mentioned push-button switch takes place.

A better understanding of the present invention may be had from the following detailed description when read in connection with the accompanying drawings in which.

MULTIPLE FUNCTION OF MOTOR

The projector to be hereinafter disclosed in detail is unique in that it only requires a single split-phase electric motor having a single solenoid operated clutch to supply the necessary energy that is required:

(1) T actuate an automatic projecting lens focusing mechanism during one instant of projector time;
(2) To actuate a slide raising mechanism during another instant of projetcor time;
(3) To actuate a mechanism that will cause a shutter to be moved between the projector's light source and the projetcor's lens at another instant of time;
(4) To actuate still another mechanism for moving a tray locking tooth actuator out of engagement with an indexing gear on an outer ring portion of the tray after a silde that has been projected is returned by gravity to the tray, and;
(5) To actuate a tray moving mechanism that will rotate the tray through a preselected angle to a position in which the next slide to be shown is moved into a twelve o'clock position.

Multiple function of motor (1) auto-focus function of motor

Figure 2:
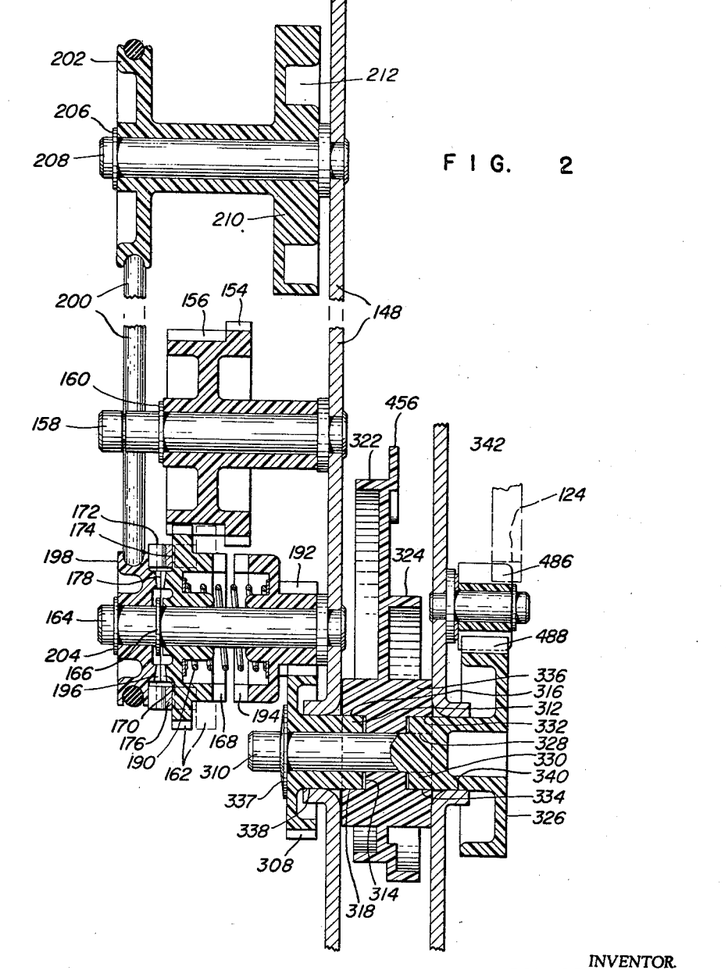
FIGURE 2 is a sectional view taken along the line 2—2 of FIGURE 1.
Figure 10:
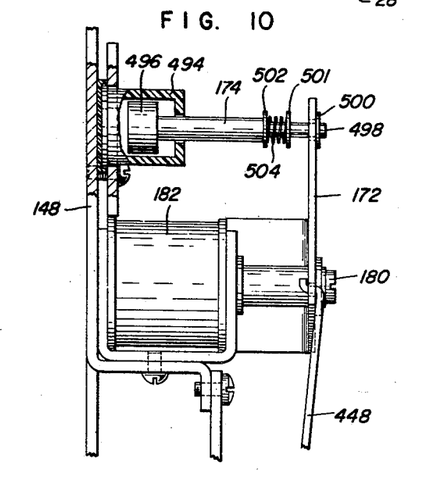
FIGURE 10 shows how a damping device can be connected to the solenoid actuator shown in FIGURES 10 and 13.

The A.C. motor 146 used to perform the aforementioned function is a split-phase type. This motor 146 is mounted on a rear chassis plate 148 and is best shown in FIG. 10 that discloses a rear view of the projector 1. The shaft 150 of the motor 146 has a worm 152 fixedly mounted thereon to rotate therewith in a clockwise and counter-clockwise direction. The worm 152 is in mesh with a worm wheel 154 of a preselected diameter in order to act as a motor speed reducing unit. FIG. 2 shows the worm wheel 154 and a spur gear 156 that is integral therewith is freely mounted for rotation on a stationary stub shaft 158 which shaft is fixedly mounted on a stationary support plate 148.

The gears 154, 156 are retained in position on the shaft 158 by means of a snap-on gear retaining ring 160. The spur gear 156 is in splined driving engagement with a second spur gear 162 that, in turn, is mounted in a slidable and rotatable fashion on another stationary stub shaft 164.

All of the worm and gear driving parts that have been previously described and which will hereinafter be described are constructed on a plastic material trade named nylon, or from an equivalent material.

FIG. 2 shows that the second spur gear 162 is prevented from sliding toward the left end of the shaft by means of a snap-on gear retaining ring 166. The gear 162 has a first series of circumferentially spaced apart molded face clutch teeth 168 forming an annular right end face surface portion thereof and a second series of circumferentially spaced-apart molded clutch teeth 170 forming an annular left end surface thereof.

A lever 172 is shown in FIG. 2 in the form of a bent plate which has two V-shaped portions 174, 176 formed therein. The points of these V-shaped portions 174, 176 are shown in engagement with two opposite flat left side face portions of the gear 162. A circular wall portion 178 of the plate lever 172 is shown between these V-shaped portions 174, 176 to form an aperture in the plate lever 172.

Figure 1:
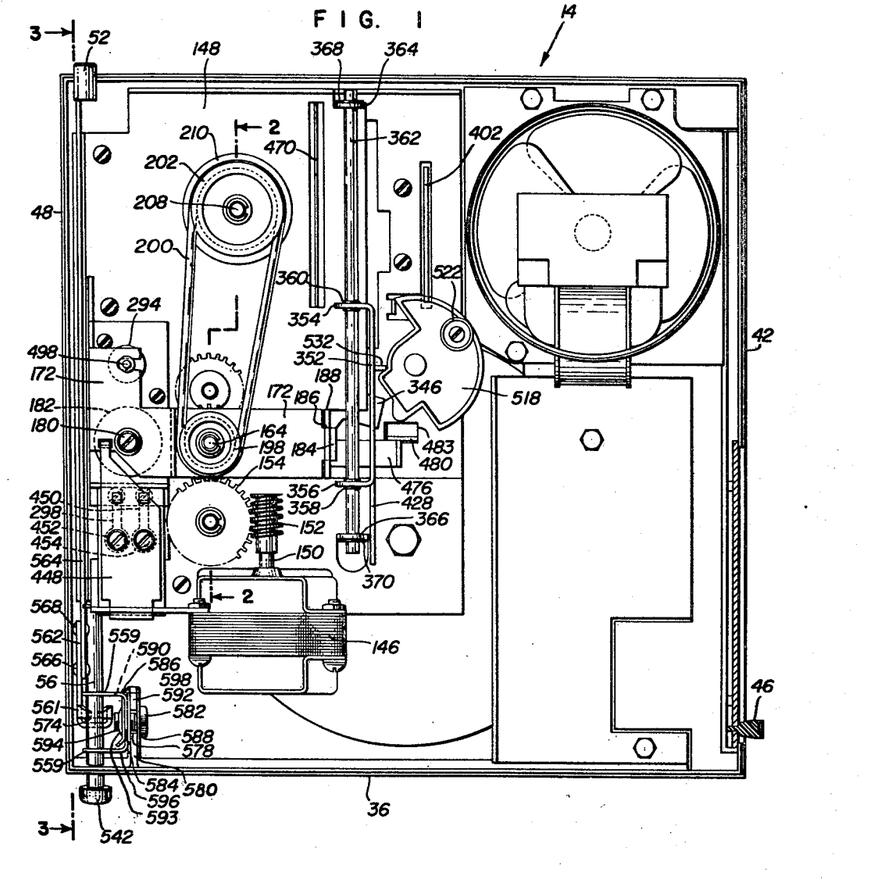
FIGURE 1 shows a rear view of the projector.
Figure 3:
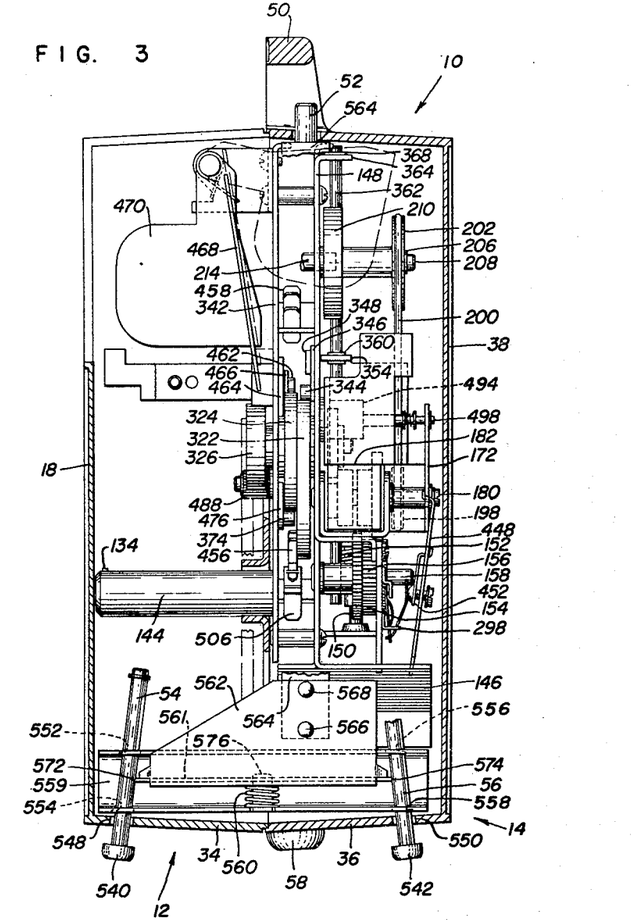
FIGURE 3 is a view partially in section taken along the line 3—3 of FIGURE 1.

FIGS. 1 and 3 show the left end of the plate lever 172 is connected for actuation by means of an actuating rod-shaped plunger 180 of a solenoid 182 that is, in turn, mounted on a chassis plate 148. The other end portion 184 of the lever 172 is pivotally supported in a wall 186 forming a slot in a bent portion 188 of the chassis plate 148.

When the motor 146 is used to perform an automatic focusing function the plunger 180 of the solenoid 182 will be moved to its outward position, the face of the spring 190 that is shown extending in compressing engagement between the right face of the gear 162 and the left face of the gear 192 that has clutch teeth 194 thereon will be in the solid line spring expanded position as shown in FIG. 2. Under this condition the clutch teeth 168 on the right face of the driven gear 162 will be retained in non-driving clutched-out engagement with the clutch teeth 194 of the gear 192 that is rotatably mounted on the stub shaft 164. Under this condition the clutch teeth 170 of the motor driven gear 162 will be forced by the spring 190 into clutched-in driving engagement with the clutch teeth 196 on the right face of the pulley 198. A belt 200 is then used to transmit the transmitted rotary motion of the motor 146 to a second pulley 202.

A snap-on retaining ring 204 is employed to retain the pulley 198 that is mounted to rotate about the shaft 164 from sliding off its left end and another similar retaining ring 206 is employed for the same purpose with the pulley 202 that is rotatably mounted on the stationary stub shaft 208. The stub shaft 208, in turn, is shown supported on an upper portion of the previously-referred-to chassis support plate 148.

The split-phase motor 146 is supplied with power from a low voltage winding (25–30 volts) on the fan motor 288 through the switch 298. Two capacitors 300, 302 are connected across the motor winding so that the winding is balanced with no phase shift between them. In this condition no power is developed by the motor 146. Connected across each capacitor 300 and 302 is a silicon controlled rectifier 304, 306, the gate of one being connected to point A, while the other is connected to point B. The center point of resistors 294 and 296 is connected to the common cathode of the two silicon-controlled rectifiers 304 and 306. The polarity of the voltage difference between A and B will depend on which of the photocells 278 and 280 is more strongly illuminated and this, in turn, will determine which of the two rectifiers 304 or 306 will conduct. With one rectifier 304 or 306 conducting, half wave voltage will be applied directly to that side of the motor winding so that a phase shift appears between the two windings and the motor 146 drives in the appropriate direction as previously explained until, via the mechanical optical system already described, the bridge is restored to balance.

Multiple function of motor (2) slide raising mechanism

When the motor 146 is employed to perform a slide raising function, the plunger 180 of the solenoid 182 will be energized to pull the plunger into the solenoid. When this occurs, the plate lever 172 that is connected to the outer end of the plunger 180 will be moved in the same general inwardly moving direction as the plunger about the chassis plate 188 on which its other end 184 is pivotally mounted. Movement of the lever 172 in this fashion will, in turn, cause its V-shaped portions 172, 174 that are in contact with the gear 162 to apply a force to the gear 162 in a direction that will move it from its solid line position to its dotted line position as shown in FIG. 2.

When the gear 162 is moved to its dotted line position, the spring 190 will be compressed to a greater extent than it was before this gear movement took place.

The movement of the gear 162 to this new dotted line position will cause the clutch teeth 170 on its left face to be moved to a disengaged-unclutched position with the clutch teeth 196 on the right face of the pulley 198 and will cause the clutch teeth 168 on the right face of the gear 162 to be moved into clutched engagement with the clutch teeth 194 of the gear 192.

The gear 192 is shown in driving relationship with a gear 308 that is pressed fitted on a shaft 310 and coupled by means of two keys 312, 314 and its associated slot connections 316, 318 with the hub portion 320 of a first cam 322.

A second cam 324 is molded as a single unit to the first cam 322 so that both cams 324 and 322 and the driving gear 308 rotate as a single unit. Cams 324 and 322 are preferably made of a suitable plastic material such as that tradenamed Nylon or an equivalent material.

The right end of the shaft 310 has a single tooth gear 326 mounted thereon that has a pair of spaced-apart keys 328, 330 that engaged key slot 332 and 334 in the hub portion 336 at the right end of the cam 324 so that the rotary motion that is transmitted by the motor 146 and the aforementioned gearing to the cams 332, 324 can be transmitted by the cam 324 to a single tooth gear 326 which is preferably made of the same material as the cams 324, 322. The left end of the shaft 310 has a retaining clip 337 thereon to prevent the shaft 310 from moving to the right.

From the above description it can be seen that the shaft 310, the gear 308, cams 322, 324, and single tooth gear 326 are constructed to rotate as a single unit on the cylindrical punched-out wall surface portions 338, 340 of the chassis plates 148 and 342.

Figure 4:
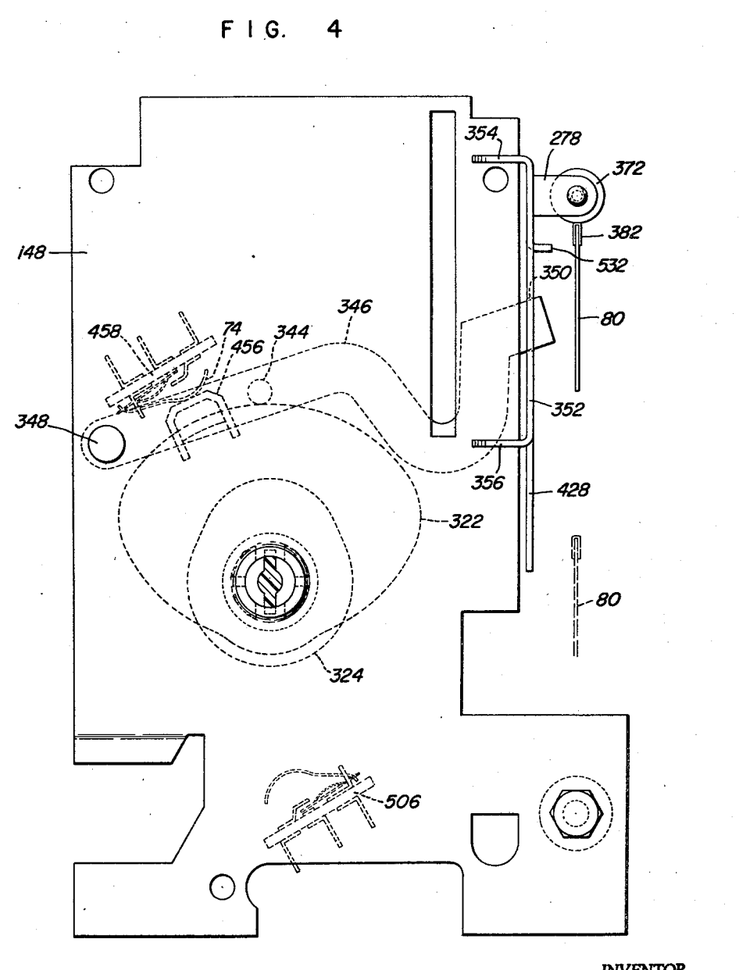
FIGURE 4 is a view of the main and secondary cams shown in FIGURES 2 and 3.
Figure 5:
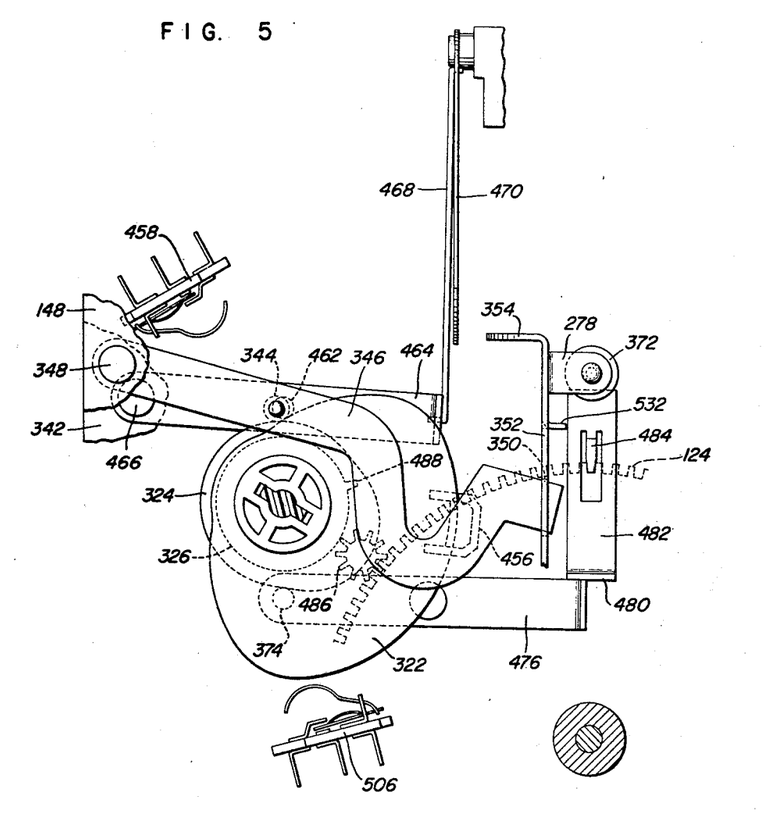
FIGURE 5 shows the position of the slide-lifting drive bar and shutter as this cam-driven, magnet-carrying drive bar is starting to move the slide in an upward position from the tray.
Figure 6:
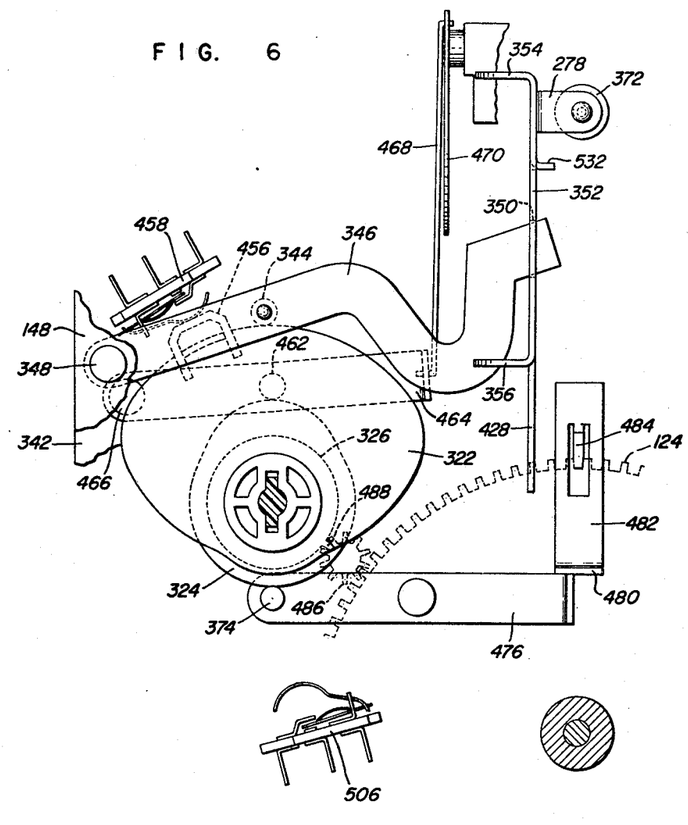
FIGURE 6 shows the "show" position of the slide lifting drive bar and shutter as the aforementioned cam-driven, magnet-carrying drive bar has moved the slide into an in-gate slide projecting position.
Figure 7:
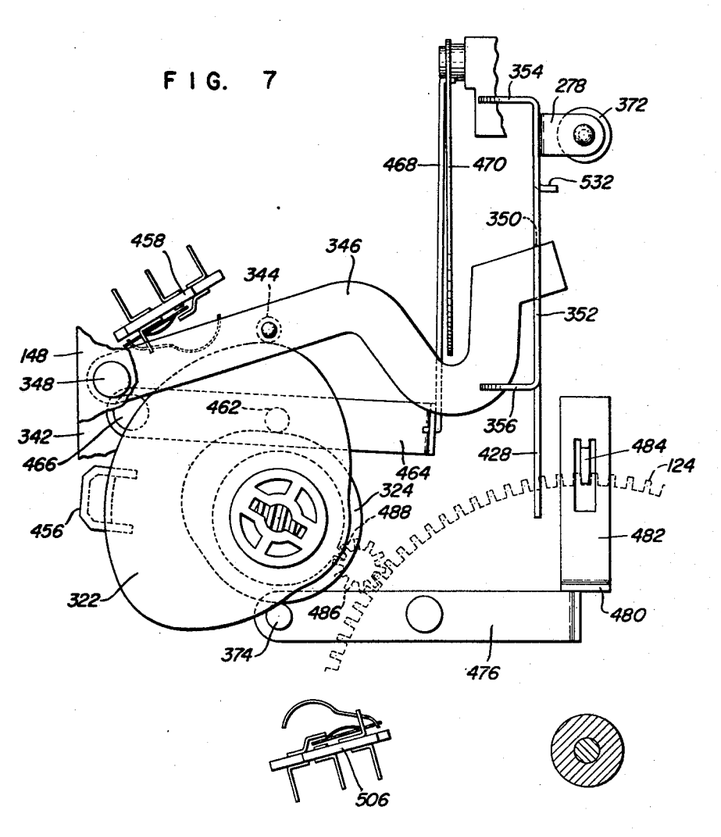
FIGURE 7 shows the position of the slide-lifting drive bar and shutter as this cam-driven, magnet-carrying drive bar is starting to let the slide be returned by gravity to the tray.
Figure 8:
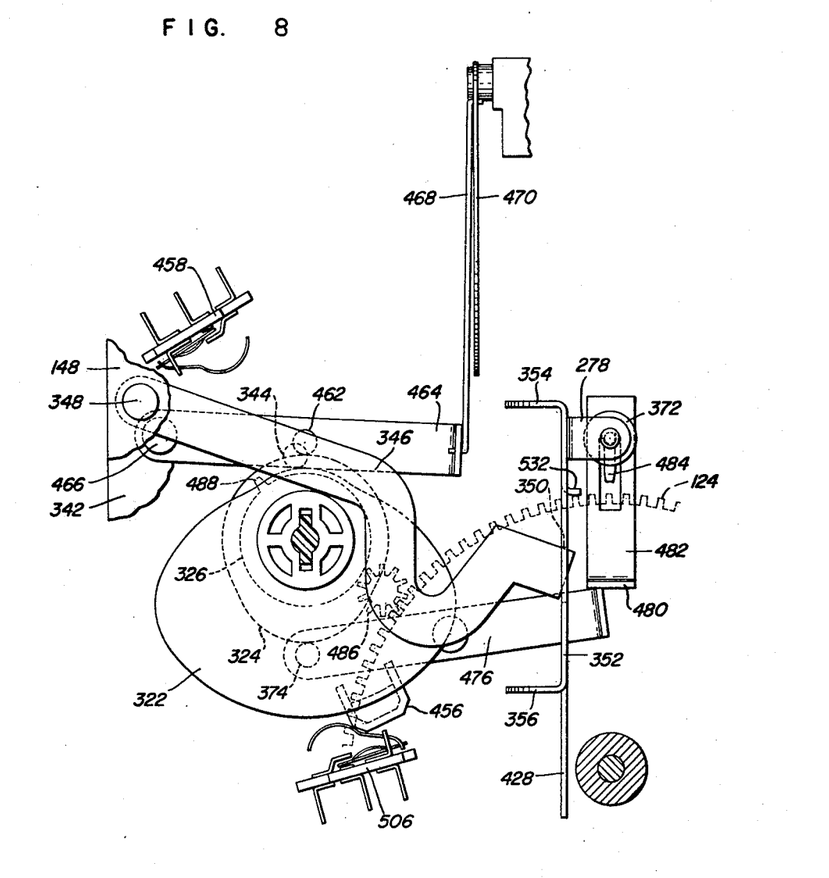
FIGURE 8 shows the position of the slide-lifting drive bar and shutter as this cam-driven, magnet-carrying drive bar has moved the slide back into its original slide tray position and the tray is being rotated to bring the next slide in the tray to a twelve o'clock position.
Figure 9:
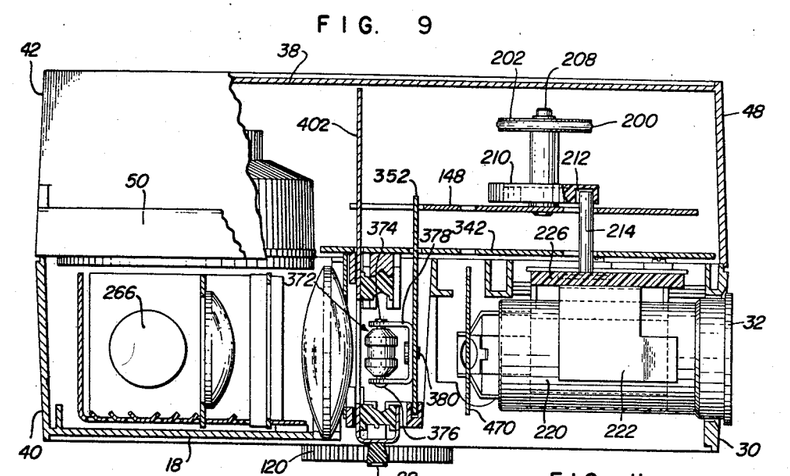
FIGURE 9 shows a top plan view, partially in section, of the slide guides and how a movable permanent magnet, such as shown in FIGURE 4, is attached to a slide.

As the main cam 322 is rotated during a slide lifting operation, it moves a pin follower 344 that is fixedly mounted on a drive arm 346 in an upward direction as shown in FIG. 4. As this operation takes place, the drive arm 346 will be rotated in a counter-clockwise direction about a rivet-shaped stub shaft 348 that is fixedly connected to the chassis plate 148.

While this upward movement of the arm 346 takes place the upper free or right end of the drive arm 346 will be moved into lifting sliding engagement with the upper end of a wall 350 forming a slot in the drive bar 352. The length of the wall 350 that forms this slot is purposely made of a greater height than the height of the right end of the drive arm 346 in order to provide freedom of movement for the different portions of the free end of the arm 346 that are brought into alignment with the slot as it is moved about its pivot.

The drive bar 352 is shown in FIG. 1 as having two bent apertured bar portions 354, 356 that have cylindrically-shaped, nylon-bearing inserts 358, 360 therein. These bearings will enable the drive bar 352 to be easily slidably moved by the drive arm 346 along the support shaft 362 when clockwise or counter-clockwise rotation is transmitted by the reversible motor 146 to the cam 322 as shown in FIGS. 16–20.

The shaft 362, in turn, is supported against sidewise movement in two apertured wall portions 364, 366 of the chassis plate 148 and also supported against up and down movement by means of snap-on retaining rings 368, 370 as shown in FIG. 1.

When the motor 146 is driving the cam 322 in a forward direction as shown in FIG. 4 the magnet will lift the metal clip 382 and the slide 80 to which it is clamped in an upward direction between this slide's lower dotted line or in-slide tray position to its slide projecting position.

This slide raising action will take place as the roller 344 is brought into contact with the outer surface portion of the cam 322 whose radial distance from its rotating center is being gradually increased to a point on the cam that is at the farthest radial distance from its center of rotation.

When the cam 322 has passed the previously-referred-to slide in gate projecting position or a position in which its pin follower 344 is at its greatest distance from the center of shaft 310 on which it is rotatably mounted, any additional clockwise rotation of the cam 322 as shown in FIG. 4 will allow the pin follower 344 to be lowered by gravity along with its associated drive arm 346, drive bar 152, the U-shaped member 278, magnet 372, the metal clip 382 and the slide 80 until the slide 80 has been returned to the same position in the tray 20 and into contact with the outer surface of the hub 66 from which it was previously lifted.

Figure 11:
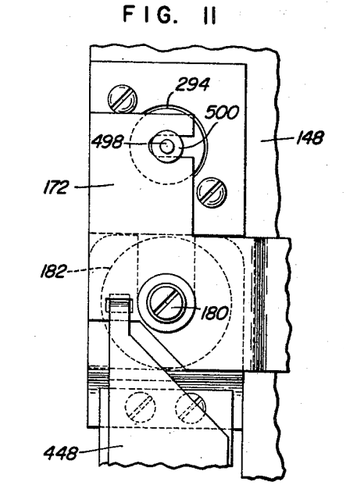
FIGURE 11 shows a right end view of FIGURE 22.
Figure 12:
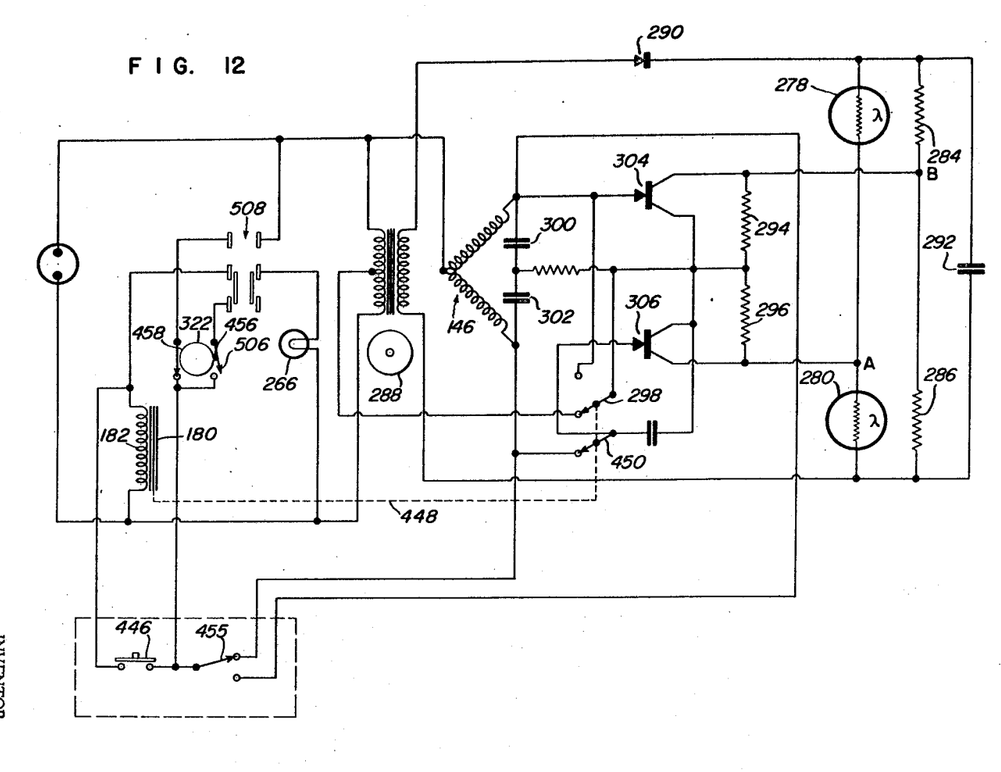
FIGURE 12 is a circuit diagram showing the relationship that exists between all of the electrical components disclosed in FIGURES 1, 3 and 4.

When a slide change is thereafter required, a show switch 446 is operated and this completes the circuit through the solenoid 182 shown in FIGURES 1, 3, and 10, 11 and 12 and the split-phase motor 146, FIGURES 1 and 12. The solenoid plunger 180 shown in FIGURES 1, 3, and 10 and 11 acts on two levers 172, 448 in the mechanism. Lever 448 operates the switches 298 and 450 via the adjustable insulating buttons 452 and 454 shown in FIGS. 10 and 13. At this point, switch 298 disconnects the low voltage winding from the motor 146 and shorts out the capacitor 300 leaving capacitor 302 connected across the motor 146. Switch 450, at the same time, disconnects the anode of the silicon-controlled rectifier 306 so that the higher voltage from the line supply will not damage it. The silicon controlled rectifier 304 is protected by the fact that it is shorted out by switch 298. The previously-mentioned second lever 172 actuated by the solenoid 182 moves the gear 162, overcoming the force of spring 190 to engage the face clutch teeth 168 of gear 162 with the clutch teeth 194 of gear 192. The motor rotates in the selected forward or reverse switch direction selected by switch 455 driving gear 192 which, in turn, drives the gear 308 which is attached to the main cam 322. The lobe 456 which forms part of the main cam 322 has been holding switch 458 open and, as soon as the cam 322 has rotated through a small angle, the switch 458 reverts to its normally closed condition and maintains the circuit so that the button operating slide change 446 need not be held depressed by the operator.

The lobe 456 acts on switch 458 through the switch arm 492 and opens the switch 458 so that the solenoid 182 is de-energized, the levers 448 and 172 as shown in FIG. 1 move back under the influence of the spring 190, as shown in FIG. 2.

FIGS. 10 and 11 show a preferred embodiment of the above that includes a damper cup 494 and plunger 496. This may be an air system with an "O" ring seal and a fine orifice (possibly a porous material) or a viscous system using a high viscosity fluid. The plunger shaft 498 passes through the lever 172 between the shoulder 174 and stop 500. When the solenoid 182 pulls the lever 172 the lever 172 acts on the shoulder 174 by way of washer 501, spring 502 and washer 504 and drives the plunger 496 inward. When the solenoid 182 releases, the lever 172 shown in FIG. 2 travels rapidly out to the stop 500, a distance sufficient to disengage the clutch teeth 168 on the moving gear 162 from the clutch teeth 194 on gear 192. The action of the damper system then flows down the remaining travel of the gear 162 so that the clutch teeth 170 do not engage the clutch teeth 196 of the auto-focus pulley 198 until the inertial rotational forces of the motor 146 have been substantially dissipated. This prevents the residual inertia of the motor 146 which is rotating at a higher speed during the slide changing process, from driving the system out of focus during the initial stage in which the motor 146 is switched over from its slide lifting operation to perform its automatic focusing operation. In this manner no de-focusing and re-focusing is unpleasantly apparent in the projected image.

"LOAD CONDITION"

So far the mechanism has been described moving from the projection of one slide 80 to the next slide 78 or 82, depending on which direction the motor is rotating, with a slide always under projection in the gate. A condition to be hereinafter described as "load" is also required in which the slide 80 in the gate projecting position is returned to the tray 20 and the tray 20 is freed for manual rotation to any position and for removal from the projector 10. FIGURES 16 and 27 show a switch 506 positioned so that the lobe 456 will act upon it when the slide 80 has been returned to the tray 20 and the tooth 484 is disengaged from the tray teeth 124. Under projection position "show" this switch 506 is not in circuit. Movement of the operator-controlled switch 508 from the "show" position to the "load" position shown in FIGURE 12 disconnects switch 458 and connects switch 506 so that the system driven by motor 146 will not stop in the position determined by switch 458 but will rotate to the desired "load" position determined by the switch 506. The switch 508 may also be conveniently used to disconnect the projector lamp 266 when it is not required in the "load" position.

What is claimed is:

1. A switching circuit comprising a push-button operated electric switch, a shaft, an electric motor, a cam operably connected for rotation with the shaft, a solenoid actuated clutch, said motor and clutch being electrically connected by means of a conductor with an electric power supply unit, said switch being connected with the conductor and forming a means of cutting out the power flowing from said power supply unit to said clutch and motor when in a nondepressed position, said clutch being further operably connected by the power from the supply unit to clutch said shaft to said motor and to thereby transmit arcuate rotary movement of the motor to the cam immediately after the first switch is depressed, a second switch in said switching circuit electrically connected to the electric power supply unit, the motor and solenoid actuated clutch, a lobe protruding from the cam and retaining the second switch in an open position, the second switch being electrically connected for movement by the lobe out of its open switch position into a normally closed, out of contact position with the lobe to thereby continue to supply electric driving power from the power supply to the motor and the solenoid actuated clutch when said first switch is released and the resulting arcuate rotary movement of the shaft, cam and lobe is completed to thereby effect a rapid release of the first switch without interrupting the source of power being supplied to the motor to drive its associated shaft.

References Cited

UNITED STATES PATENTS

| | | | |
|---|---|---|---|
| 2,391,333 | 12/1945 | Nardone | 192—02 |
| 2,941,638 | 6/1960 | Hoover | 192—02 |
| 3,036,683 | 5/1962 | Fischer et al. | 192—142 |

BENJAMIN W. WYCHE III, Primary Examiner

U.S. Cl. X.R.

192—142